No. 848,871. PATENTED APR. 2, 1907.

G. WHITE.

CHUCK FOR TRANSFER PRESSES.

APPLICATION FILED JUNE 17, 1904.

Attest:

A. N. Jesbera.

M. A. Brayley.

Inventor:

George White by Redding, Kiddle & Greeley

Attys.

THE NORRIS PETERS CO., WASHINGTON, D. C.

UNITED STATES PATENT OFFICE.

GEORGE WHITE, OF JERSEY CITY, NEW JERSEY.

CHUCK FOR TRANSFER-PRESSES.

No. 848,871. Specification of Letters Patent. Patented April 2, 1907.

Application filed June 17, 1904. Serial No. 213,049.

*To all whom it may concern:*

Be it known that I, GEORGE WHITE, a citizen of the United States, residing in Jersey City, county of Hudson, State of New Jersey, have invented certain new and useful Improvements in Chucks for Transfer-Presses, of which the following is a specification, reference being had to the accompanying drawings, forming a part hereof.

In my Letters Patent No. 819,829, dated May 8, 1906, there is shown and described a transfer-press by which letters or other characters in relief formed upon or carried by a master-roll or chuck are transferred in intaglio to a plate which may thereafter be used for printing in the same manner as an engraved plate. The master-roll or chuck is rolled in contact with the plate under pressure, and in order that one roll may be used many times it is necessary not only that the hardened-steel type-blocks, which bear the characters to be transferred, shall be secured rigidly in place in the chuck, but that the surfaces of the chuck which contact with the type-block and with the working plate or surface of the press shall be of hard metal, so that they shall not be indented or distorted under the pressure to which they are subjected, lest the finer lines of the transferred impression suffer or fail of proper formation. Of course it would be possible to form the master-roll or chuck entirely of hard metal, like tool-steel; but this would be impracticable by reason of the difficulty of working such metal in the form required for the proper holding of the type-blocks.

It is therefore the object of the present invention to provide for such a construction of the chuck or master-roll as shall enable the type-blocks to be rigidly secured in place and those surfaces of the chuck which receive the pressure either of the type-blocks or of the working surfaces of the machine to be formed of hard metal, like tool-steel, while the body of the chuck is formed of a metal more easily worked, like machine-steel.

The invention will be more fully described hereinafter with reference to the accompanying drawings, in which it is illustrated as embodied in a form suitable for the purpose, and in which—

Figure 1:
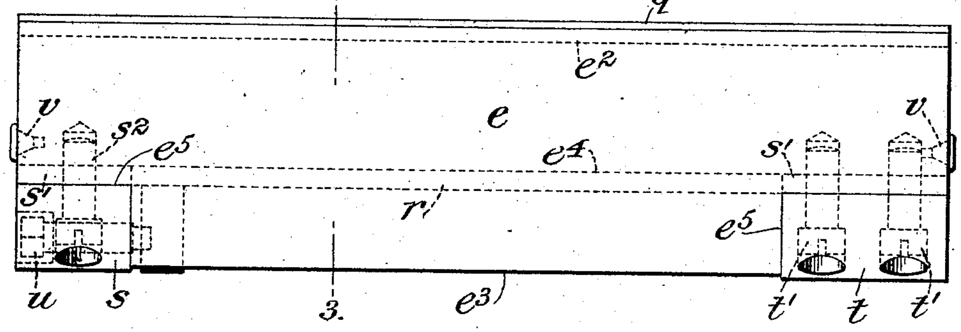
Figure 2:
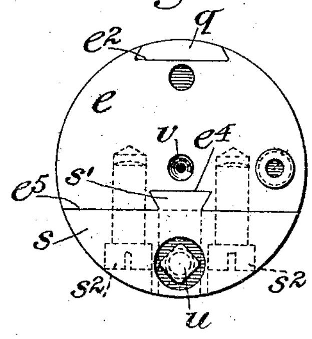
Figure 3:
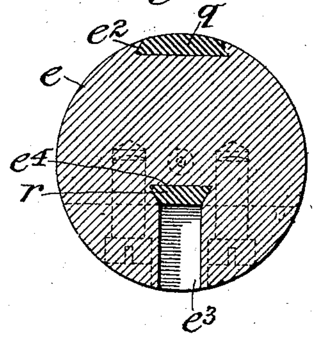

Figure 1 is a view of the improved chuck or master-roll in side elevation. Fig. 2 is an end elevation thereof, and Fig. 3 is a transverse section on the plane indicated by the line 3 3 of Fig. 1.

The main body $e$ of the chuck may be formed of machine-steel or some other metal suitable for the purpose and easily worked. It is generally cylindrical, but is provided along one side, parallel with the axis, with a groove or slot $e^2$, preferably undercut or dovetailed, as clearly shown in Fig. 2. Along the opposite side of the body and also parallel with the axis is a deeper slot $e^3$, adapted to receive the type-blocks with a close working fit. At the bottom of the slot $e^3$ is another longitudinal slot $e^4$, also preferably dovetailed or undercut, as shown in Fig. 3. At each end, on the side corresponding to the slot $e^3$, the body $e$ is cut away, as at $e^5$, to form a seat for a thrust-block, hereinafter described.

In the slot or groove $e^2$ is fitted a bearing-plate $q$, of hard metal, like tool-steel, which makes contact with the hard working plate of the press. In the groove or slot $e^4$ is likewise fitted a hard-metal plate $r$, as of tool-steel, which is adapted to receive the pressure transmitted through the type-blocks, which are placed in the slot $e^3$ and rest upon the plate $r$. In the seats $e^5$, formed therefor in the body $e$ of the chuck, are placed the thrust-blocks $s$ and $t$, which complete the cylinder at the ends for coöperation with those parts of the press which hold the chuck against the working plate when the copper plate is withdrawn. These thrust-blocks may be formed with dovetailed projections, as at $s'$, to engage the dovetailed slot $e^4$, as clearly indicated in Fig. 2, if it be desired. Both blocks are also firmly secured to the body $e$ of the chuck, as by screws $s^2$ and $t'$, respectively, and the block $s$ also receives, parallel with the axis of the roll, a thrust or binding screw $u$, by which the type-blocks and the filling-pieces employed may be locked in the slot $e^3$ by pressure against the thrust-block $t$, thus being firmly held in position. The threaded hole in the block $s$ is suitably countersunk in its outer end to receive the head of the screw, so that there shall be no projecting parts to interfere with the proper operation of the chuck when in use in the press. Each end of the chuck may also be provided, if desired, with a thimble $v$ for coöperation with the centering-screws which hold the chuck in its carriage, as shown in my Letters Patent No. 821,911, dated May 29, 1906.

It will be obvious that the body *e* of the chuck is easily machined from comparatively soft metal, such as machine-steel, particularly as the slots and seats formed therein are cut through from end to end or from side to side, as the case may be, while those portions of the chuck which directly receive the great pressure of the press are formed of hard metal not likely to be indented or distorted by the pressure. Furthermore, these portions of hard metal—namely, the filling-strips *q* and *r*—being straight, with flat surfaces, may also be formed with a minimum of difficulty.

I claim as my invention—

1. A chuck for transfer-presses, comprising a body slotted longitudinally to receive the type-blocks and a pressure-receiving plate of relatively hard metal in the bottom of said slot, substantially as described.

2. A chuck for transfer-presses, comprising a body of metal slotted on opposite sides, one of said slots being adapted to receive the type-blocks, and plates of hard metal in said slots for contact with the type-blocks and the working plate of the press respectively substantially as described.

3. A chuck for transfer-presses, comprising a body of metal slotted to receive the type-blocks and formed with seats at the ends of the slot, a plate of hard metal in said slot to receive the pressure of the type-blocks, and thrust-blocks secured in said seats at the ends of said slot, substantially as described.

4. A chuck for transfer-presses, comprising a body of metal slotted to receive the type-blocks and formed with seats at the ends of the slot, a plate of hard metal placed in said slots to receive the pressure of said type-blocks, thrust-blocks secured in said seats at the ends of said slot and a binding or locking screw seated in one of said thrust-blocks, substantially as described.

5. A chuck for transfer-presses, comprising a body of metal slotted to receive the type-blocks and having at the bottom of said slot an undercut or dovetailed slot and a plate of hard metal seated in said dovetailed slot to receive the pressure of the type-blocks, substantially as described.

6. A chuck for transfer-presses, comprising a body of metal slotted to receive the type-blocks and having at the bottom of said slot an undercut or dovetailed slot and formed with seats, a plate of hard metal in said dovetailed slot to receive the pressure of the type-blocks and thrust-blocks secured in said seats and having dovetailed projections to engage said dovetailed slot, substantially as described.

This specification signed and witnessed this 13th day of April, A. D. 1904.

GEORGE WHITE.

In presence of—
GEORGE WHITE, Jr.,
JAMES F. FIELDER.